(12) United States Patent
Valdes-Garcia et al.

(10) Patent No.: US 10,958,214 B2
(45) Date of Patent: Mar. 23, 2021

(54) PHASE NOISE REDUCTION IN VOLTAGE CONTROLLED OSCILLATORS

(71) Applicant: International Business Machines Corporation, Armonk, NY (US)

(72) Inventors: Alberto Valdes-Garcia, Chappaqua, NY (US); Bodhisatwa Sadhu, Peekskill, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/839,663

(22) Filed: Apr. 3, 2020

(65) Prior Publication Data
US 2020/0235700 A1 Jul. 23, 2020

Related U.S. Application Data

(63) Continuation of application No. 15/832,069, filed on Dec. 5, 2017, now Pat. No. 10,666,191, which is a
(Continued)

(51) Int. Cl.
*H03B 5/12* (2006.01)
*H03B 1/00* (2006.01)
(Continued)

(52) U.S. Cl.
CPC ........... *H03B 5/1212* (2013.01); *G06F 30/30* (2020.01); *G06F 30/327* (2020.01); *G06F 30/36* (2020.01);
(Continued)

(58) Field of Classification Search
CPC .......... H03B 2200/0038; H03B 5/1228; H03B 5/1215; H03B 5/1243; H03B 5/1281;
(Continued)

(56) References Cited

U.S. PATENT DOCUMENTS 5,675,478 A 10/1997 Kiser
6,545,555 B1 4/2003 Justice et al.
(Continued)

FOREIGN PATENT DOCUMENTS

EP 1220440 A2 7/2002
EP 2144370 A1 1/2010

OTHER PUBLICATIONS

Hajimiri et al., "A General Theory of Phase Noise in Electrical Oscillators", Feb. 1998 IEEE.
(Continued)

*Primary Examiner* — Arnold M Kinkead
(74) *Attorney, Agent, or Firm* — Scully, Scott, Murphy & Presser, P.C. Jeffrey S LaBaw, Esq.; Jeffrey S LaBaw, Esq.

(57) ABSTRACT

A voltage controlled oscillator (VCO), a method of designing a voltage controlled oscillator, and a design structure comprising a semiconductor substrate including a voltage controlled oscillator are disclosed. In one embodiment, the VCO comprises an LC tank circuit for generating an oscillator output at an oscillator frequency, and an oscillator core including cross-coupled semiconductor devices to provide feedback to the tank circuit. The VCO further comprises a supply node, a tail node, and a noise by-pass circuit connected to the supply and tail nodes, in parallel with the tank circuit and the oscillator core. The by-pass circuit forms a low-impedance path at a frequency approximately twice the oscillator frequency to at least partially immunize the oscillator core from external noise and to reduce noise contribution from the cross-coupled semiconductor devices.

15 Claims, 10 Drawing Sheets

Related U.S. Application Data continuation of application No. 15/093,194, filed on Apr. 7, 2016, now Pat. No. 9,917,548, which is a continuation of application No. 14/152,330, filed on Jan. 10, 2014, now Pat. No. 9,330,214.

(51) Int. Cl.
*G06F 30/30* (2020.01)
*G06F 30/36* (2020.01)
*G06F 30/327* (2020.01)

(52) U.S. Cl.
CPC ............ *H03B 1/00* (2013.01); *H03B 5/1215* (2013.01); *H03B 5/1228* (2013.01); *H03B 5/1243* (2013.01); *H03B 5/1281* (2013.01); *H03B 2200/009* (2013.01); *H03B 2200/0038* (2013.01)

(58) Field of Classification Search
CPC ............ H03B 5/1212; H03B 2200/009; G06F 17/5063; G06F 17/5045; G06F 30/30; G06F 30/36; G06F 30/327
USPC ............ 331/167, 117 FE, 107 DP, 99, 177 V
See application file for complete search history.

(56) References Cited

U.S. PATENT DOCUMENTS

| | | | |
|---|---|---|---|
| 6,603,367 B2 | 8/2003 | Pao et al. | |
| 8,102,216 B1 | 1/2012 | Kaczynski | |
| 8,710,937 B1 | 4/2014 | Sutardja | |
| 8,773,211 B2 | 7/2014 | Roithmeier | |
| 9,330,214 B2* | 5/2016 | Valdes-Garcia | H03B 5/1243 |
| 9,917,548 B2* | 3/2018 | Valdes-Garcia | H03B 5/1215 |
| 10,666,191 B2* | 5/2020 | Valdes-Garcia | H03B 5/1281 |
| 2007/0069830 A1 | 3/2007 | Kelkar et al. | |
| 2008/0284530 A1 | 11/2008 | Pellerano et al. | |
| 2011/0309888 A1 | 12/2011 | Bulzacchelli et al. | |
| 2012/0068776 A1 | 3/2012 | Asamura et al. | |
| 2012/0092050 A1 | 4/2012 | Kumar et al. | |
| 2012/0235759 A1 | 9/2012 | Pfeiffer et al. | |
| 2012/0319783 A1 | 12/2012 | Martchovsky et al. | |
| 2012/0319787 A1 | 12/2012 | Trivedi et al. | |
| 2012/0319790 A1 | 12/2012 | Nakamura | |
| 2013/0044838 A1 | 2/2013 | Ding et al. | |
| 2013/0063218 A1 | 3/2013 | Sadhu et al. | |
| 2013/0194050 A1 | 8/2013 | Lee | |
| 2013/0259106 A1 | 10/2013 | Tarighat Mehranani | |
| 2013/0299903 A1 | 11/2013 | Botula et al. | |
| 2014/0266479 A1 | 9/2014 | Rong et al. | |

OTHER PUBLICATIONS

Lee et al., "A Novel Phase Noise Reduction Technique in Oscillators Using Defected Ground Structure", Feb. 2002 IEEE.

Hegazai, "A Filtering Technique to Lower LC Oscillator Phase Noise" IEEE Journal of Solid-State Circuits, vol. 36, No. 12, Dec. 2001.

\* cited by examiner

PHASE NOISE REDUCTION IN VOLTAGE CONTROLLED OSCILLATORS

CROSS REFERENCE TO RELATED APPLICATIONS

This application is a continuation of U.S. patent application Ser. No. 15/832,069, filed Dec. 5, 2017, now U.S. Pat. No. 10,666,191, issued May 26, 2020, which is a continuation of U.S. patent application Ser. No. 15/093,194, filed Apr. 7, 2016, now U.S. Pat. No. 9,917,548, issued Mar. 13, 2018, which is a continuation of U.S. patent application Ser. No. 14/152,330, filed Jan. 14, 2014, now U.S. Pat. No. 9,330,214, issued May 3, 2016. The entire contents and disclosures of U.S. patent application Ser. Nos. 15/832,069, 15/093,194 and 14/152,330 are hereby incorporated herein by reference in their entireties.

STATEMENT OF GOVERNMENT INTEREST

This invention was made with Government support under Contract No.: FA8650-09-C-7924 (Defense Advanced Research Projects Agency (DARPA)). The Government has certain rights in this invention.

BACKGROUND

This invention generally relates to voltage controlled oscillators, and more specifically, to reducing noise in such oscillators.

In general, a VCO (voltage controlled oscillator) is an oscillator circuit that outputs an AC signal having a frequency that varies in response to an input control voltage. VCOs are fundamental components that are employed in a broad range of applications including radar and communications systems (e.g., wireline or wireless applications) for data transfer and recovery processes. By way of example, VCOs are utilized for PLL (phase locked loop) circuits, DLL (delay locked loop) circuits, and injection locked oscillators. VCOs are further employed for applications such as frequency translation, data modulation, clock distribution and clock/data recovery.

In the operation of a VCO, an undesired random phase component, referred to as phase noise, is often introduced into the oscillator output. This phase noise, which varies over time, may be due to the thermal noise present in the components of the oscillator, loss in the passive components, and to other factors. Oscillator phase noise is a key performance metric in many oscillator applications including many wireless and wireline communications applications, radars, sensors, images, data converters, and so forth.

BRIEF SUMMARY

Embodiments of the invention provide a voltage controlled oscillator (VCO), a method of designing a voltage controlled oscillator, and a design structure comprising a semiconductor substrate including a voltage controlled oscillator.

In one embodiment, the VCO comprises an LC tank circuit for generating an oscillator output signal at an oscillator frequency ($f_o$), and an oscillator core including first and second cross-coupled semiconductor devices connected to the tank circuit to provide regenerative feedback to the tank circuit to help maintain the oscillator output stable. The VCO further comprises a supply node connected to the tank circuit and to the oscillator core for connecting the VCO to a voltage source, a tail node connected to the tank circuit and to the oscillator core for connecting the VCO to a current source, and a noise by-pass circuit. The noise by-pass circuit is connected to the supply node and to the tail node, in parallel with the LC tank circuit and the oscillator core, and forms a low-impedance path at a frequency approximately twice the oscillator frequency to at least partially immunize the oscillator core from external noise and to reduce noise contribution from the cross-coupled semiconductor devices.

In one embodiment of the voltage controlled oscillator, the noise by-pass circuit comprises a series resonance tuned to resonate at approximately twice the oscillator frequency.

In one embodiment of the voltage controlled oscillator, the noise by-pass circuit includes a capacitor and an inductor located in series.

In one embodiment, of the voltage controlled oscillator, the noise by-pass circuit includes a capacitor and a transmission line located in series.

In one embodiment, the voltage controlled oscillator further comprises a frequency control to apply a variable signal to the noise by-pass circuit to adjust the frequency at which the noise by-pass circuit resonates.

In one embodiment, the frequency control includes a variable voltage source to apply a variable voltage to the by-pass circuit to adjust the frequency at which the noise by-pass circuit resonates.

In an embodiment, the frequency control includes a variable digital signal source to apply a variable digital signed to the by-pass circuit to adjust the frequency at which the noise by-pass circuit resonates.

In an embodiment, the noise by-pass circuit includes a variable capacitor, and the frequency control applies the variable signal to the variable capacitor to vary a capacitance thereof and thereby to vary the frequency at which the noise by-pass circuit resonates.

In an embodiment, the noise by-pass circuit includes a capacitor and a transmission line, and the frequency control applies the variable signal to the transmission line to vary the frequency at which the noise by-pass circuit resonates.

In one embodiment, the noise by-pass circuit includes a capacitor.

In one embodiment, the invention provides a method of designing a voltage controlled oscillator comprising an LC tank circuit for generating an oscillator output, an oscillator core to provide regenerative feedback to the tank circuit, supply and tail nodes, and a noise by-pass circuit. The method comprises designing the oscillator core to generate the oscillator output at a frequency of $f_o$, biasing the core, and connecting the core to a voltage supply; designing the noise by-pass circuit at approximately twice the frequency of the oscillator output; and introducing the noise by-pass circuit into the VCO. The noise by-pass circuit is connected to the supply node and to the tail node, in parallel with the LC tank circuit and the oscillator core, to at least partially immunize the oscillator core from external noise and to reduce noise contribution from the oscillator core. The method further comprises tuning the noise by-pass circuit to obtain a specified performance of the VCO.

In one embodiment, the noise by-pass circuit is designed to include a capacitor and a transmission line in series.

In an embodiment, the capacitor and the transmission line in the noise by-pass are selected so that the noise by-pass circuit resonates at approximately twice the frequency of the oscillator output.

In an embodiment, the noise by-pass circuit is connected to a variable signal to vary the frequency at which the noise by-pass circuit resonates.

In one embodiment, the noise by-pass circuit is tuned by adjusting the variable signal connected to the noise by-pass circuit to adjust the frequency at which the noise by-pass circuit resonates to obtain the specified performance.

In one embodiment, the invention provides a design structure tangibly embodied in a machine readable medium for design, manufacturing, or testing a semiconductor device. The design structure comprises a semiconductor substrate including a voltage controlled oscillator (VCO). The VCO comprises an LC tank circuit for generating an oscillator output signal at an oscillator frequency ($f_o$), and an oscillator core including first and second cross-coupled semiconductor devices connected to the tank circuit to provide regenerative feedback to the tank circuit to help maintain the oscillator output stable. The VCO further comprises a supply node connected to the tank circuit and to the oscillator core for connecting the VCO to a voltage source, a tail node connected to the tank circuit and to the oscillator core for connecting the VCO to a current source, and a noise by-pass circuit. The noise by-pass circuit is connected to the supply node and to the tail node, in parallel with the LC tank circuit and the oscillator core, and forms a low-impedance path at a frequency approximately twice the oscillator frequency to at least partially immunize the oscillator core from external noise and to reduce noise contribution from the cross-coupled semiconductor devices.

In one embodiment, the noise by-pass circuit comprises a series resonances tuned to resonate at approximately twice the oscillator frequency.

In an embodiment, the noise by-pass circuit includes a capacitor and an inductor located in series.

In an embodiment, the noise by-pass circuit includes a capacitor and a transmission line located in series.

In an embodiment, the VCO further comprises a frequency control to apply the variable signal to the by-pass circuit to adjust the frequency at which the noise by-pass circuit resonates.

DETAILED DESCRIPTION

Figure 1:
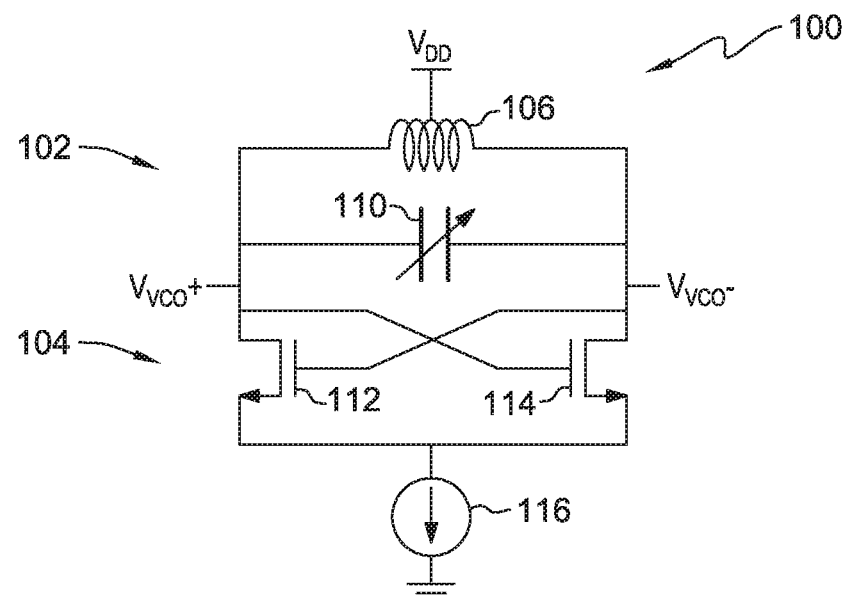
FIG. 1 shows a conventional VCO architecture.

FIG. 1 illustrates a voltage controlled oscillator (VCO) 100. VCO comprises a tank circuit 102 and an oscillator core 104. Tank circuit 102 includes inductor 106 and capacitor 110, and the oscillator core 104 includes a pair of cross-coupled transistors 112,114. At one end of the oscillator, inductor 106 is connected to a reference or supply voltage $V_{dd}$, and the other end of the oscillator is connected to a current source 116 and to ground.

VCO 100 comprises an LC VCO topology based on the parallel resonance of inductor L 106 and capacitor C 110 of tank circuit 102. The tank circuit oscillates at its resonant or natural frequency ($f_0$, where $\omega_0^2 = 1/LC$), determined by the tank circuit capacitance and inductance. An ideal tank circuit (just L and C) will oscillate purely sinusoidally at its natural frequency, indefinitely. Since nothing is ideal, all tank circuits include resistance (R). Inductor current lags voltage and capacitor current leads voltage by ninety degrees (90°). Thus, because resistor current is in phase with voltage across the resistor, tank circuit resistance shifts the phase ($\Delta^\omega$) in the tank circuit, dampens the tank circuit oscillation, and determines what is known as the tank circuit's Q factor or Q.

Therefore, typical state of the art oscillators require regenerative feedback to maintain oscillation. Phase noise is a measure of signal spread (and Q) and satisfies $$L(\Delta\omega) = \frac{4FkTR}{v_{RMS}^2} * (\omega_o/2Q\Delta\omega)^2,$$

w, where k is the Boltzman constant, T is the operating or ambient temperature, $V_{RMS}$ is the root mean square of the tank circuit voltage, and $$F = 1 + \left(\frac{4\gamma IR}{V_O\pi}\right) + \frac{8\gamma g_{mbias}R}{9}.$$

Also, for communications, phase noise is a critical parameter for measuring data transfer quality and reliability.

Essentially, Q indicates tank circuit efficiency, peak energy stored in the tank circuit $$\left(\text{reactance, } X_{L=}j\omega_oL \text{ and } X_C = -\frac{1}{j\omega_oC}\right)$$

with respect to the average energy dissipated (in the tank circuit resistance R) at resonance, i.e., Q=L/RC. Low Q circuits are, therefore, lossy and more heavily damped. Thus, the higher the Q, the closer to ideal the local oscillator tank circuit. All oscillators have some inherent/parasitic resistance, e.g., from wiring, contacts and drivers, that lowers the tank circuit Q. Minimizing this inherent/parasitic tank circuit resistance and parasitic capacitance is a focus of oscillator design, as is otherwise compensating for any residual resistance and parasitic capacitance.

To offset inherent, parasitic resistance, a typical oscillator includes a pair of cross coupled devices (e.g., bipolar transistors, field effect transistors (FETs) or logic gates, such as inverters) connected to an LC tank circuit. The cross coupled devices add negative resistance as the LC oscillates, thereby providing regenerative feedback. However, the cross coupled devices may also add more resistance and/or more capacitance (which shifts the resonant frequency). Further, circuit component age and ambient conditions, e.g., operating voltage and temperature, can alter the characteristics of the oscillator to shift the resonant frequency away from nominal. A typical voltage controlled oscillator is a tunable oscillator where a control voltage is adjusted to shift the VCO operating frequency, for example, to re-center the frequency and/or compensate for phase shift. For the state of the art voltage controlled oscillator, either the LC tank still drives output buffers directly or the LC capacitively drives the output buffers through a tapped capacitance network.

Figure 2:
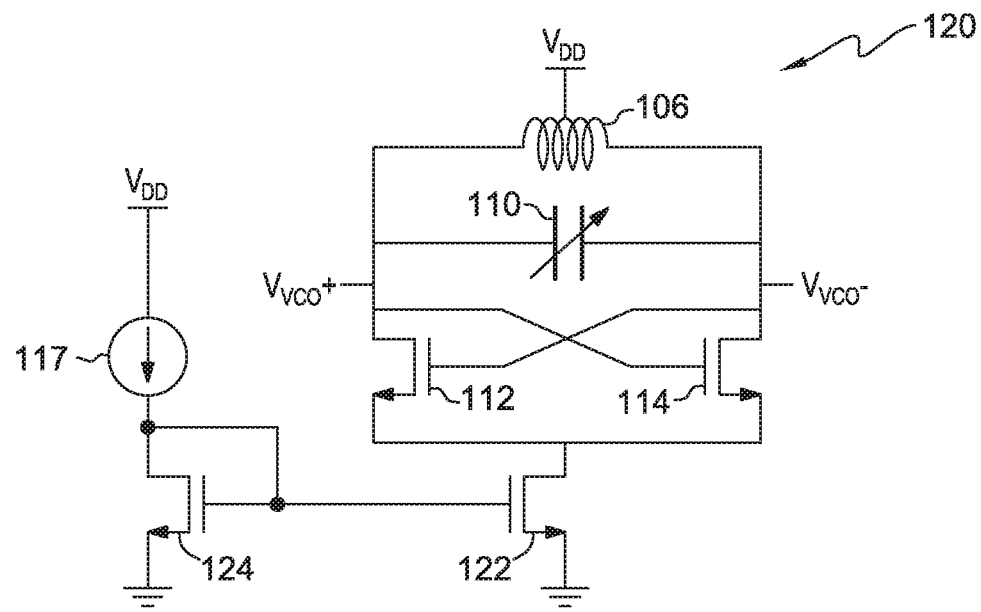
FIG. 2 illustrates a prior art technique for reducing tail noise in the architecture of FIG. 1.

With the design 120 of FIG. 2, a transistor 122 is located in series between the oscillator circuit 100 and ground, and current source 117 is connected to the VCO via the diode-connected transistor 124. Vdd is connected to one end of the current supply, and the second end of the current supply is connected to transistor 124. Transistor 124 is connected to ground, and the gate of transistor 122 is connected to the gate of transistor 124. Note that the combination of transistors 124 and 122 is only one of many ways to implement current biasing to the VCO (i.e. a transistor implementation of the current source 116 in FIG. 1) and those skilled in the art will know multiple other implementations. The phase noise reduction techniques which are the subject of this disclosure are applicable regardless of the specific way to implement current biasing at the source of 112 and 114.

Figure 3:
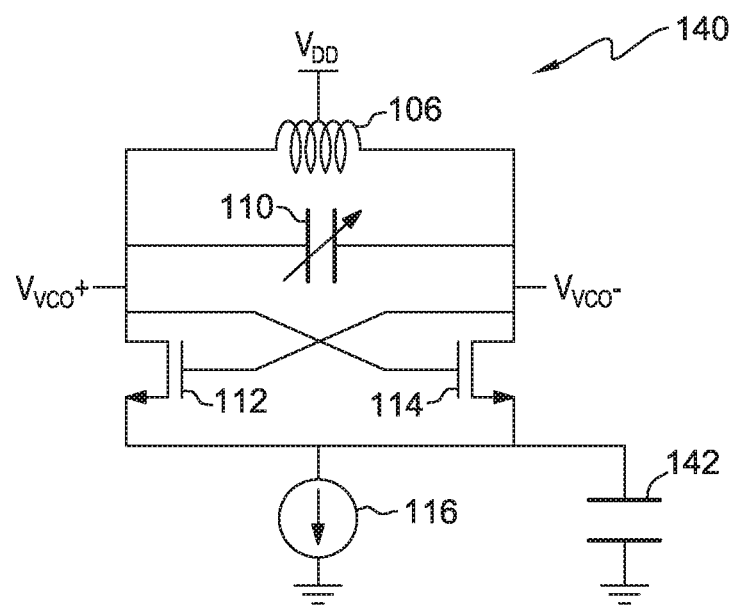
FIG. 3 depicts a second prior art technique for reducing tail noise in the architecture of FIG. 1.
Figure 4:
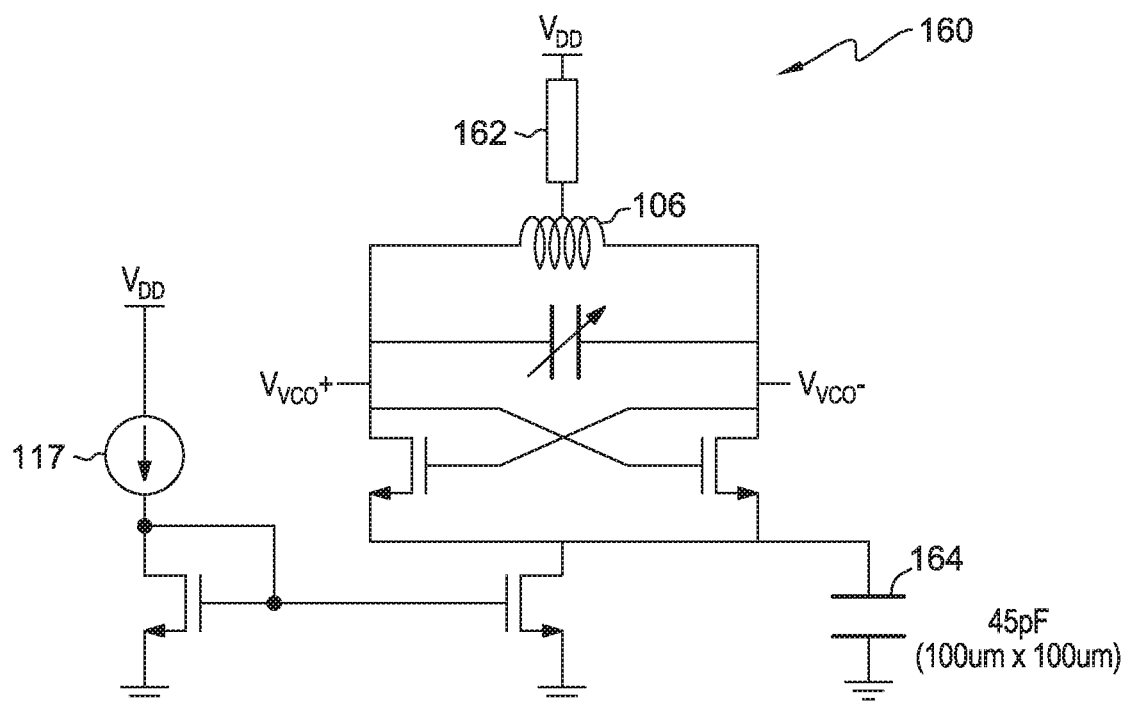
FIG. 4 illustrates another technique to reduce tail noise in the architecture of FIG. 1.

A number of techniques are used to reduce the phase noise in a VCO, and FIGS. 3 and 4 illustrate two prior art oscillators where techniques are applied to reduce phase noise.

The arrangement of FIG. 3 reduces noise, referred to as tail noise, from the tail node of the VCO. As one example:
Simulated phase noise for a 37 GHz oscillator: −121.5 dBc/Hz;
Contribution from tail source thermal noise: $2.6 \times 10^{-13}$ $V^2/Hz$ @ 25 MHz offset;
Tail noise at $2f_{osc}$ gets downconverted to output phase noise at $f_{osc}$.

With the design 140 of FIG. 3, a capacitor 142 is added in parallel with the current source 116. This technique reduces tail noise by shorting out that noise. A very large capacitor is needed to short out the noise sufficiently.

FIG. 4 illustrates a VCO 160 employing the phase noise reduction technique of FIG. 3. This circuit 160 also includes an RF choke 162 between inductor 106 and $V_{dd}$. Note that an RF choke can be implemented by a transmission line, an inductor or a combination of other circuit elements which are known in the art. In the example of FIG. 4, capacitor 164 has a capacitance of 45 pF using vncaps (B3-M1) and uses a 100 um×100 um area. With this circuit:
Simulated phase noise for a 37 GHz oscillator: −122.5 dBc/Hz;
Contribution from tail source thermal noise: $1.9 \times 10^{-13}$ $V^2/Hz$ @ 25 MHz offset: 27% lower noise from tail source.

Figure 5:
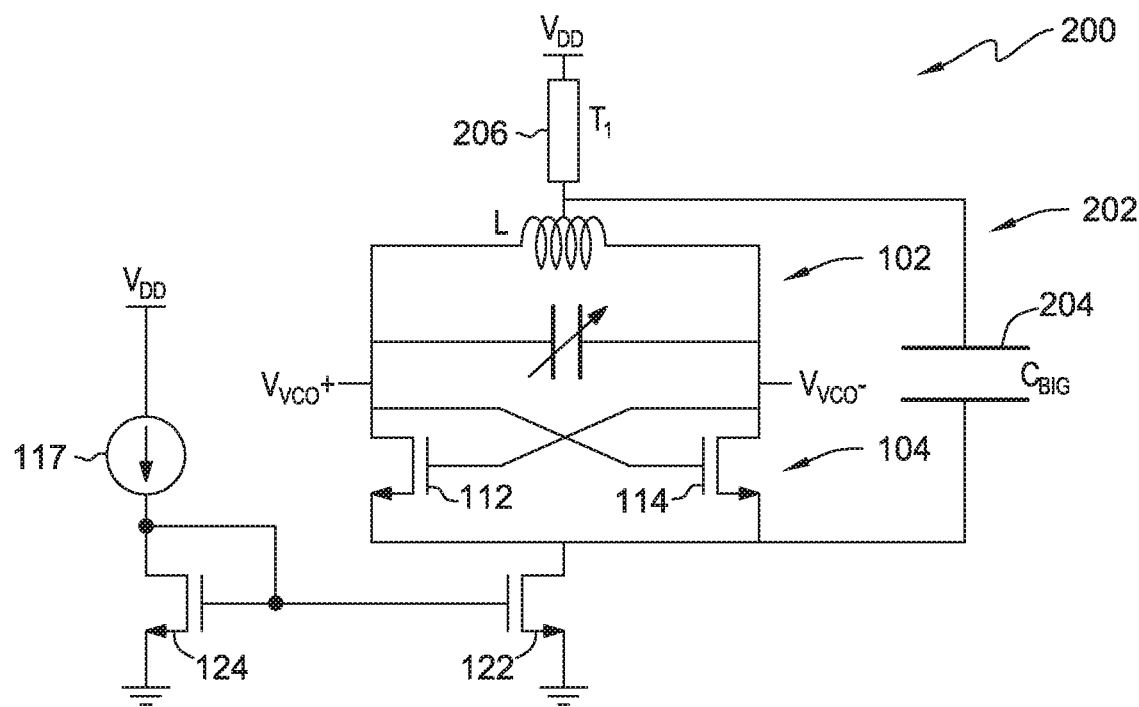
FIG. 5 shows a VCO architecture in accordance with an embodiment of this invention.

FIG. 5 shows a VCO 200 incorporating a noise reduction technique 202 in accordance with an embodiment of this invention. The architecture of FIG. 5 includes a capacitor 204 connected in parallel with tank 102 and cross-coupled transistors 112,114. This design also includes an RF-choke $T_1$ connected between inductor L 106 and $V_{dd}$.

With the design of FIG. 5, the tail noise and the supply noise by-pass the tank 102 and the cross-coupled transistors 112, 114 of the VCO. In an embodiment of the invention, the capacitance of capacitor 204 is relatively large, and as an example, C 204 may have a capacitance of 10 nF.

As an example:
Simulated phase noise for a 37 GHz oscillator: −126.6 dBc/Hz;
Contribution from tail source thermal noise: $0.48 \times 10^{-13}$ $V^2/Hz$ @ 25 MHz offset: 82% lower noise from tail source.

The design of FIG. 5 provides better performance than the tail capacitance short of FIG. 4 because with the design of FIG. 5, the noise from T1 206 also by-passes tank 102 and cross-coupled transistors 112,114. In a simulation, the circuit of FIG. 5 also reduced noise from the cross-coupled transistor pair.

Figure 6:
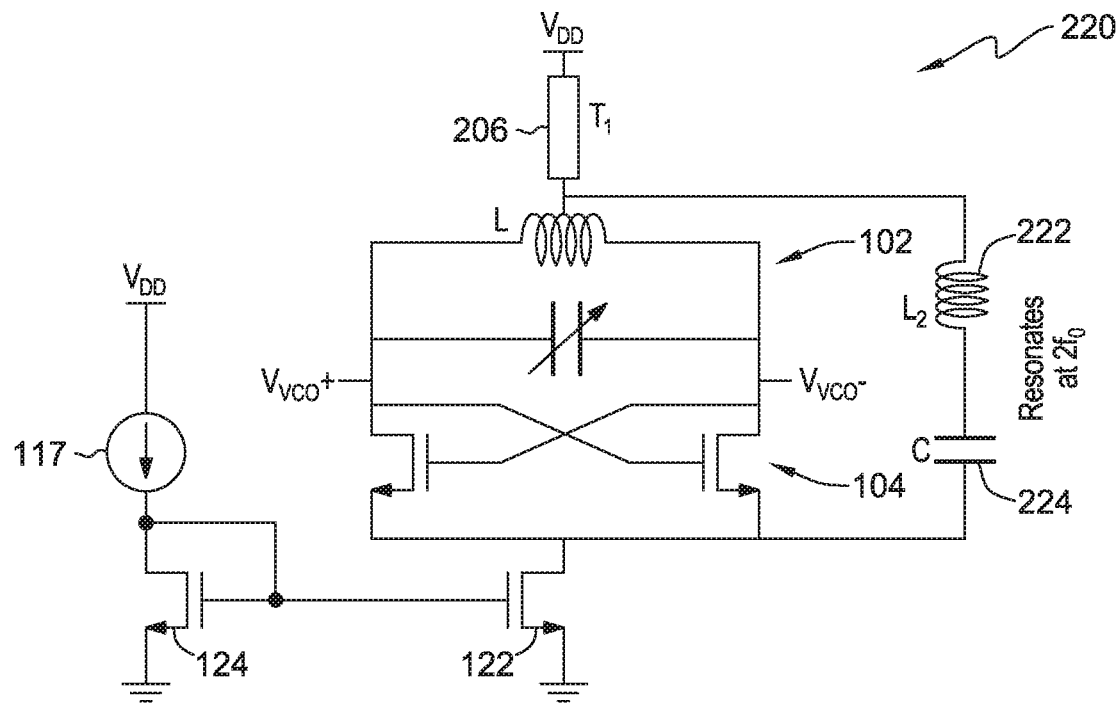
FIG. 6 illustrates an alternate embodiment of this invention.

FIG. 6 shows an alternate embodiment 220 of this invention, in which an inductor 222 is added in series with capacitor 224. The inductor 222 and capacitor 224 are tuned to resonate at twice the frequency of the oscillator ($2f_{osc}$), forming a low-impedance path at that frequency. Because the impedance seen towards this noise bypass circuit (formed by inductor 222 and 224) is lower than that seen towards the VCO core, the noise from the tail current source at $2f_{osc}$ that flows into the VCO is reduced significantly. In embodiments of the invention, the design of FIG. 6, in comparison with the design of FIG. 5, uses smaller components. For instance, in the architecture of FIG. 6, a 100 pH t-line and a 250 fF capacitor 224 may be used. As an example: Simulated phase noise for 37 GHz oscillator: −126.6 dBc/Hz (as good as C 204 of FIG. 5)

In a simulation, the circuit of FIG. 6 also reduced noise from the cross-coupled transistor pair; and in some cases, the short at $2f_{osc}$ of FIG. 6, performs slightly better than the circuit of FIG. 5.

Figure 7:
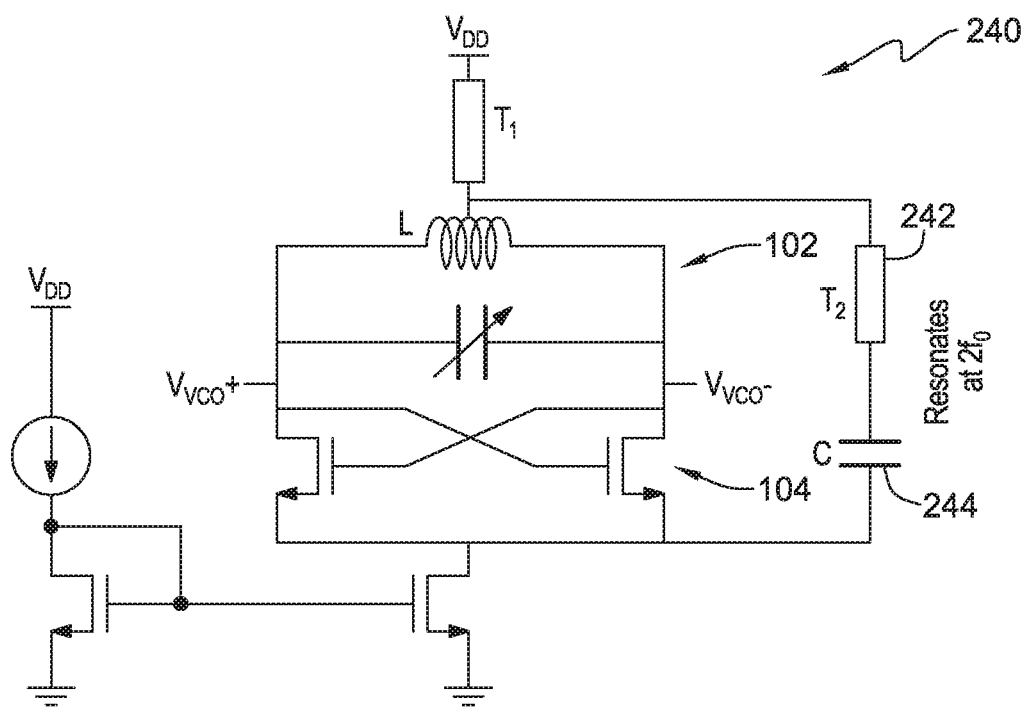
FIG. 7 depicts a third embodiment of this invention.

FIG. 7 depicts a third embodiment 240 of the invention. In this design, a transmission line T2 242 is used instead of an inductor. Line T2 and capacitor 244 are tuned to resonate at twice the frequency of the oscillator ($2f_{osc}$). The t-line 242 may be simpler to implement in a physical design than the inductor 222 of FIG. 6, and the t-line does not couple strongly with the tank inductor.

In embodiments of the invention, the frequency of the noise by-pass circuit can be changed. For a voltage controlled oscillator where the frequency of oscillation can be altered using a control voltage, another control voltage can change the frequency of the bypass circuit appropriately. The frequency of resonance of the bypass circuit can be changed, for example, using a variable capacitor (varactor), or a variable transmission line/inductor or both. The tuning of the frequency of resonance of the by-pass circuit can also be used to trade-off between noise from the gm-cell and noise from the tail bias circuit when the VCO is oscillating at a particular frequency. This trade-off can be used as a phase noise optimization for manual or digital-based calibration of the oscillator.

Figure 8:
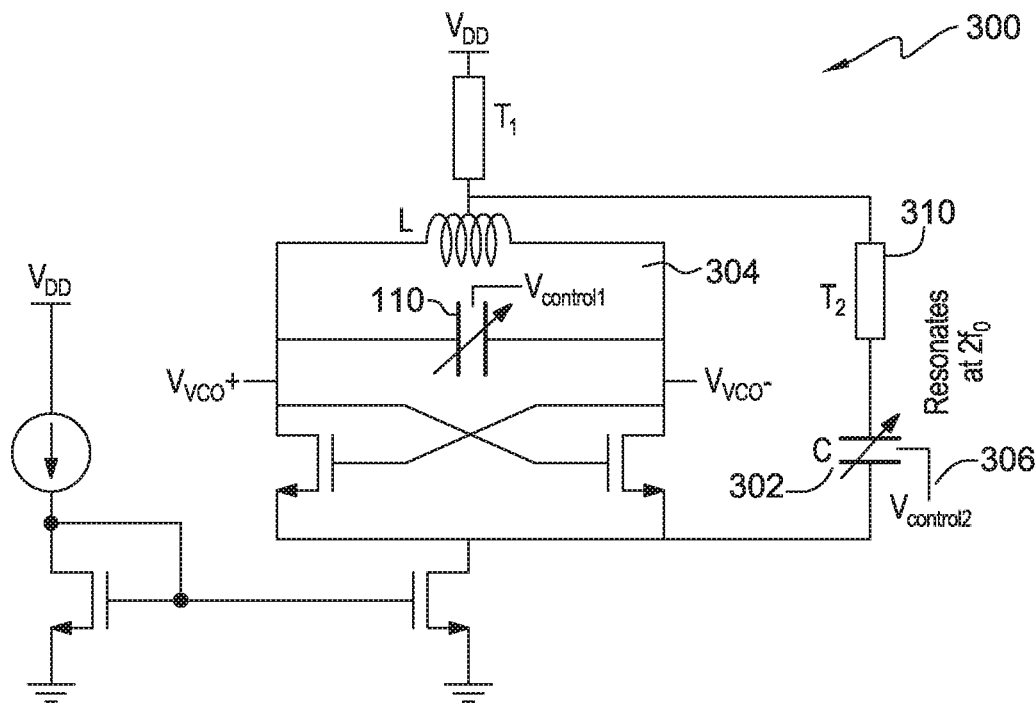
FIG. 8 shows a control option that may be used in an embodiment of this invention.
Figure 9:
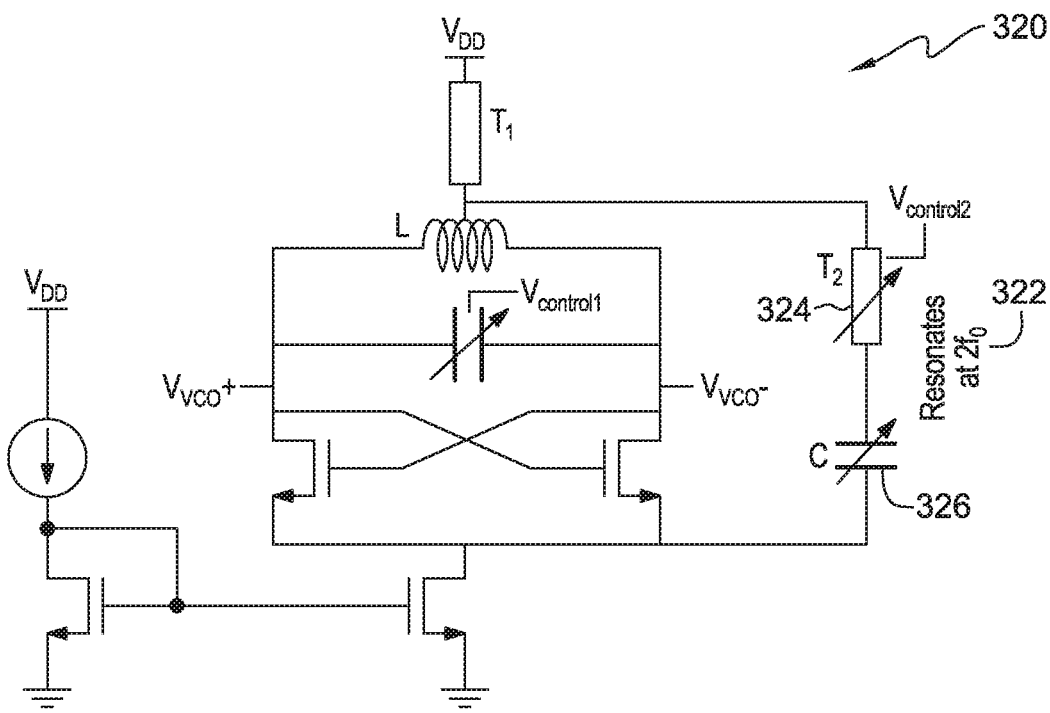
FIG. 9 shows a second control option that may be used in an embodiment of this invention.
Figure 10:
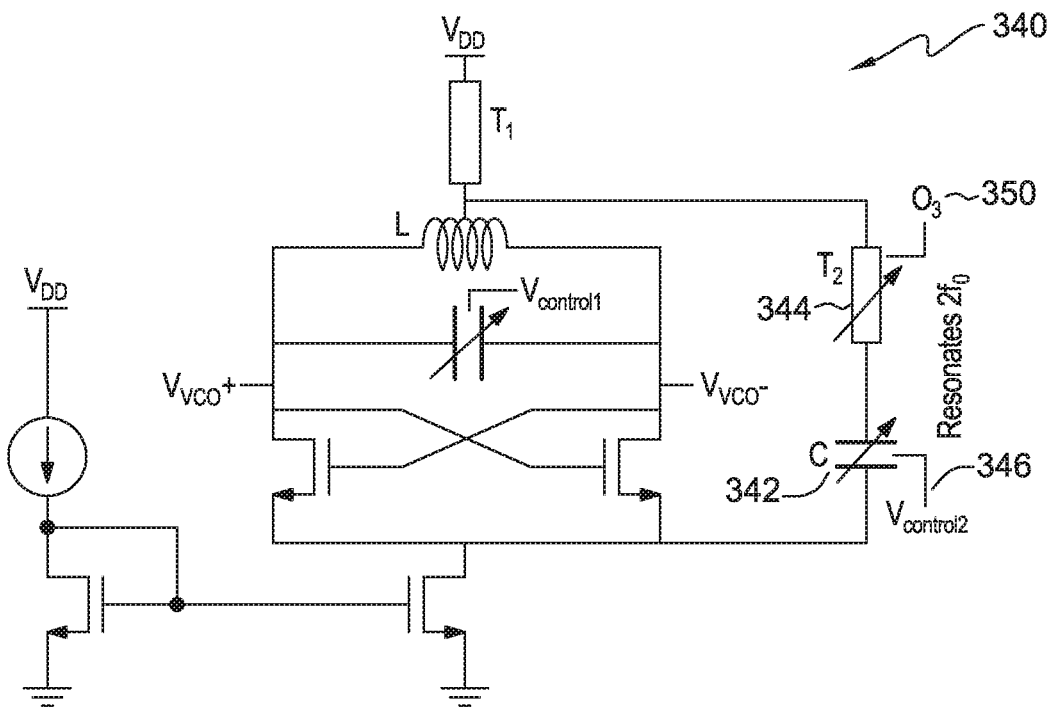
FIG. 10 illustrates a third control option that may be used in an embodiment of this invention.

FIGS. 8, 9 and 10 show three controls that may be used in embodiments of the invention.

With the embodiment 300 of FIG. 8, capacitor 302 is a variable capacitor. A first voltage control $V_1$ 304 is shown applied to capacitor 110, and second voltage control $V_2$ 306 is applied to capacitor 302. The voltage control $V_2$ is used to control the capacitor 302 such that $T_2$ 310 and the capacitor resonate at approximately $2f_{osc}$, with adjustments thereto to improve or optimize the overall performance of the oscillator.

With the arrangement 320 shown in FIG. 9, digital control set $O_2$ 322 is applied to transmission line $T_2$ 324. The control is used to set the inductance of the transmission line so that $T_2$ and capacitor 326 resonate at approximately $2f_{osc}$, with adjustments thereto to improve or optimize the overall performance of the oscillator. With this embodiment, as illustrated in FIG. 9, capacitor 326 does not need to be a variable capacitor.

The circuit 340 of FIG. 10 includes both a variable capacitor 342 and a variable inductance transmission line $T_2$ 344. Voltage control $V_2$ 346 is applied to capacitor 342, and digital control set $O_3$ 350 is applied to transmission line $T_2$. The two controls $V_2$ and $O_3$ may be used in tandem to adjust the frequency of the by-pass circuit to adjust or optimize the performance of the oscillator.

In embodiments of the invention, $V_1$, $V_2$ and $O_3$ may be linearly related to each other and can be set using an analog or a digital based control.

The by-pass technique of embodiments of the invention can be extended to a fully decoupled oscillator, as well as to other VCO architectures that utilize a core LC oscillator circuit separated from supply and ground through biasing circuits or interconnects.

Figure 11:
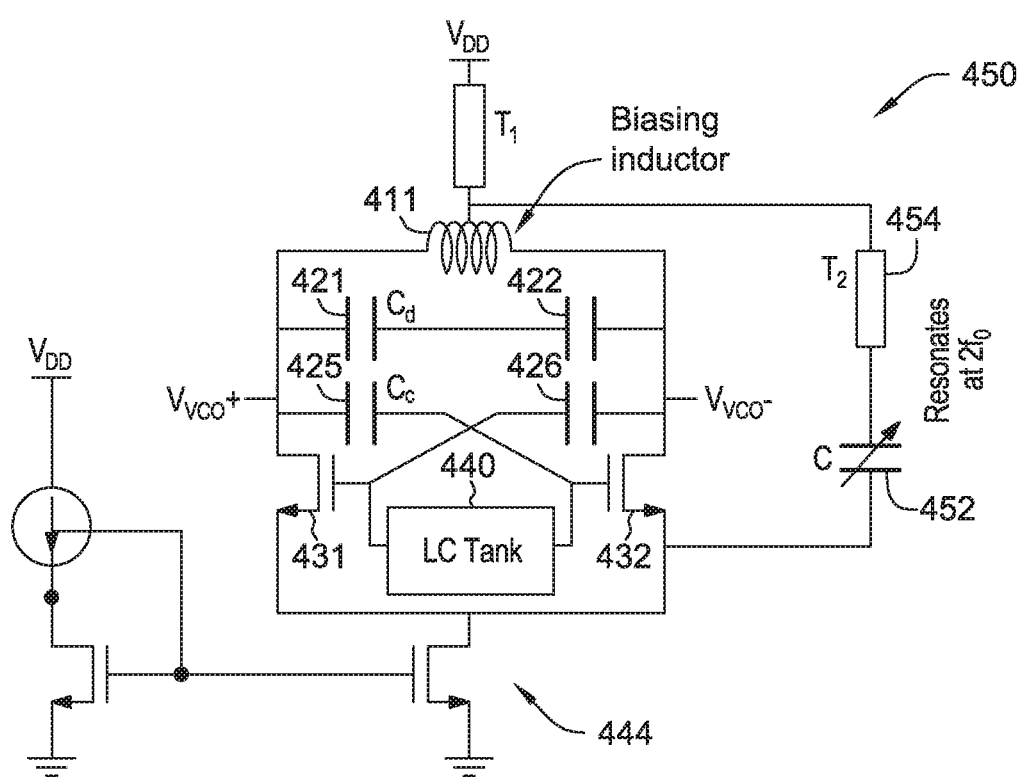
FIG. 11 shows a further embodiment of the invention.

For instance, FIG. 11 shows a fully decoupled, LC tank based oscillator topology in accordance with an embodiment of this invention. The LC tank based oscillator topology 400 includes an inductor 411, a capacitor C 421, a capacitor C 422, a capacitor $C_c$ 425, a capacitor $C_c$ 426, an active device 431, an active device 432, an LC tank 440, and a current source 444 implemented in this case by an FET device.

The gate (or base) of active device 431 is connected to a side of capacitor $C_c$ 426 and a side of LC tank 440. The gate (or base) of active device 432 is connected to a side of capacitor $C_c$ 425 and a side of LC tank 440. Another side of capacitor $C_c$ 426 is connected to the drain (or collector) of active device 432, a side of capacitor C 422 and inductor 411. Another side of capacitor $C_c$ 425 is connected to the drain (or collector) of active device 431, a side of capacitor $C_d$ 421, and a side of inductor 411. Another side of capacitor $C_d$ 421 is connected to another side of capacitor $C_d$ 422. Inductor 411 is connected to a voltage $V_{DD}$. Sources (or emitters) of active devices 431 and 432 are connected to each other and to a tail node 444.

In the example of FIG. 11, the active devices 431 and 432 are (n-channel) MOSFETS. However, given the teachings provided herein, it is to be appreciated that one of ordinary skill in the art can readily implement the topology 400 of FIG. 11 with respect to other types of active devices. Moreover, the same type of device may be used, e.g., a MOSFET, but using a p-channel version. These and other variations in the circuit elements of topology 400 are readily determined and implemented by one of ordinary skill in the art given the teachings provided herein.

VCO design 400 includes a noise by-pass circuit 450 comprised of a variable capacitor 452 and transmission line $T_2$ 454. One end of circuit 450 is connected to $V_{dd}$ via RF choke $T_1$, and a second end of the by-pass circuit is connected to transistor 446. The transmission line $T_2$ 454 and capacitor 452 are tuned to resonate at twice the frequency oscillator, $2f_o$. With this arrangement, the tail noise and the supply noise by-pass the tank 440 and the cross-coupled transistors 431, 432.

Figure 12:
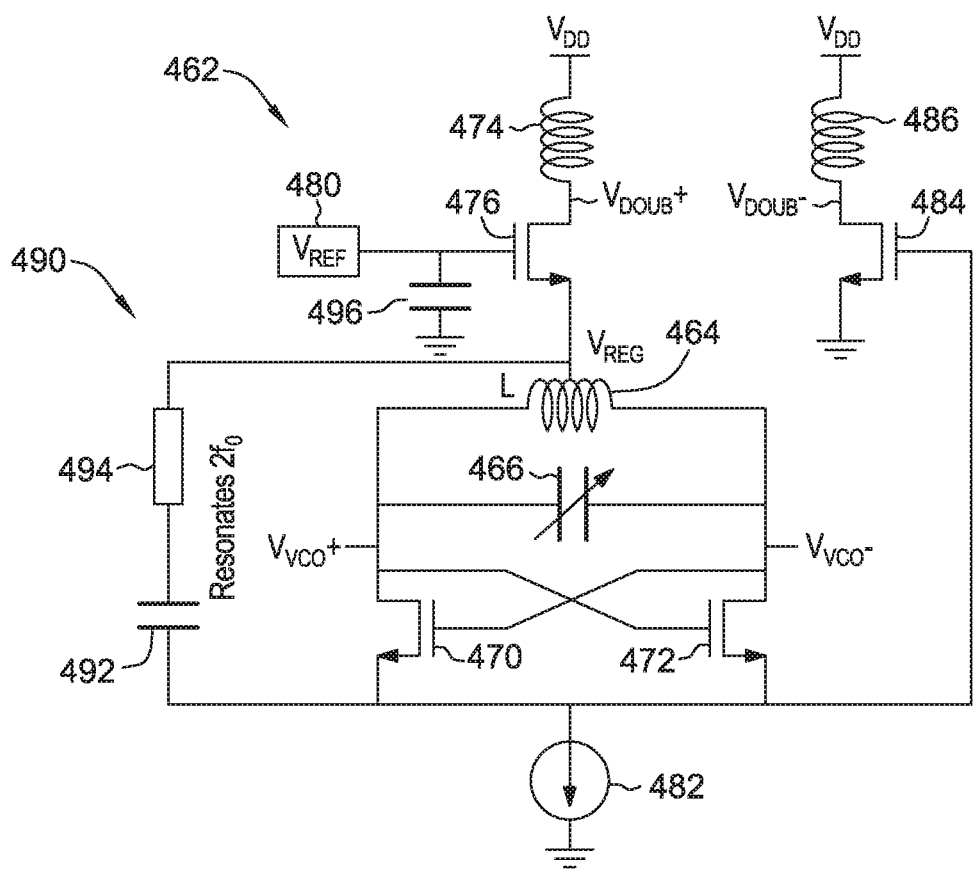
FIG. 12 illustrates an embodiment of the invention that also includes an integrated differential doubler.

FIG. 12 illustrates a further embodiment of the invention, embodied in an integrated differential doubler. In this embodiment, circuit 462 includes inductor 464, variable capacitor 466, and a pair of cross-coupled transistors 470, 472. At one end of the oscillator, $V_{dd}$ is connected to inductor 466 through inductor 474 and transistor 476, and a voltage reference 480 is applied to the gate of this transistor. The second end of the oscillator is connected to current source 482. This second end of the oscillator is also connected to $V_{dd}$ via transistor 484 and inductor 486, as shown in the Fig.

Noise by-pass circuit 490 is connected across inductor 464, capacitor 466, and cross-coupled transistors 470, 472; and the tail noise and the supply noise by-pass inductor 464, capacitor 466 and transistors 470, 472. In this embodiment, noise by-pass circuit 490 includes oscillator 492 and transmission line 494. One end of the by-pass circuit is connected to oscillator circuit 462, above current source 482, and a second end of the by-pass circuit is connected to the oscillator circuit, above inductor 464. This second end of the by-pass circuit is also connected to the reference voltage 480 via capacitor 496.

With the architecture of FIG. 12, the double frequency amplitude is equalized and increased due to the supply tail coupling. A differential doubler with current re-use can be designed while reducing VCO noise simultaneously. To do this, the by-pass 490 is tuned to twice the oscillation frequency for both applications.

Figure 13:
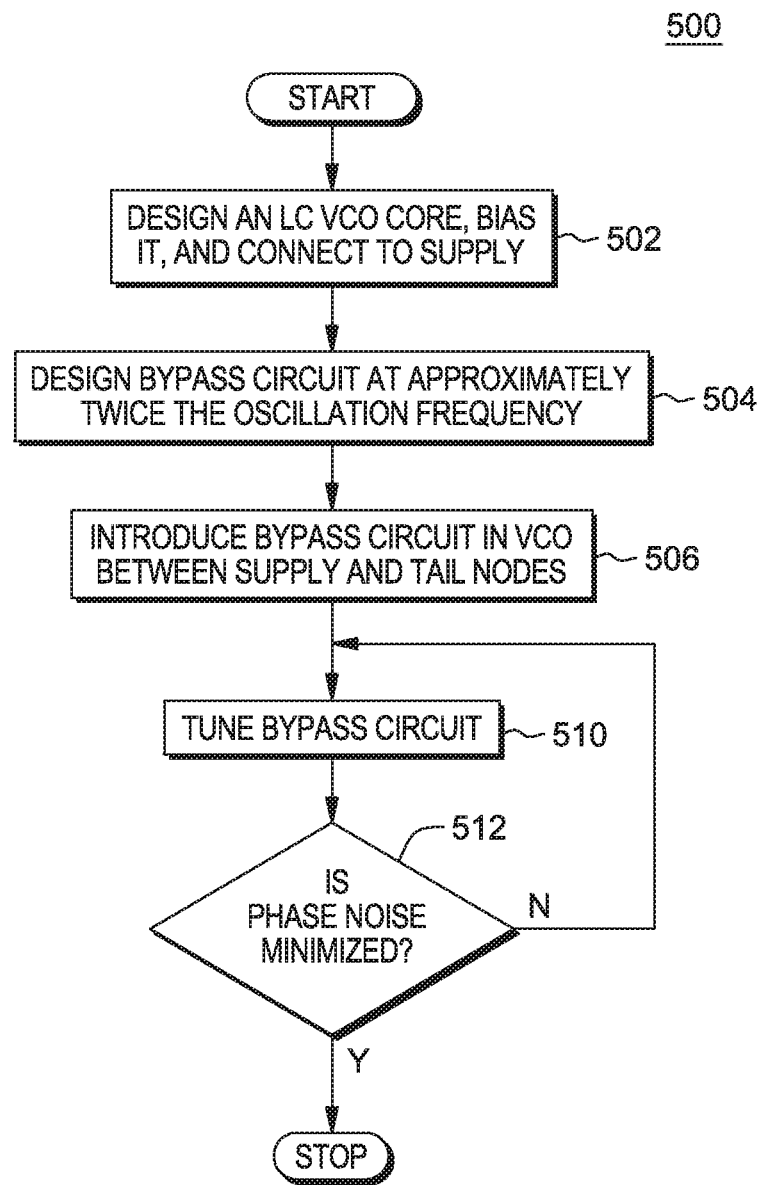
FIG. 13 illustrates a procedure for designing a VCO according to an embodiment of the invention.

FIG. 13 is a flow chart showing a design methodology 500 of an embodiment of this invention. At step 502, the LC VCC core is designed, biased, and connected to a voltage supply. The noise by-pass circuit is designed, at step 504, at approximately twice the oscillation frequency of the VCO core. The by-pass circuit is, at step 506, introduced in the VCO, between the supply and tail nodes. At step 510, the by-pass circuit is tuned; and as represented at 512, the tuning is continued until the desired performance, such as performance that minimizes phase noise, is reached.

Figure 14:
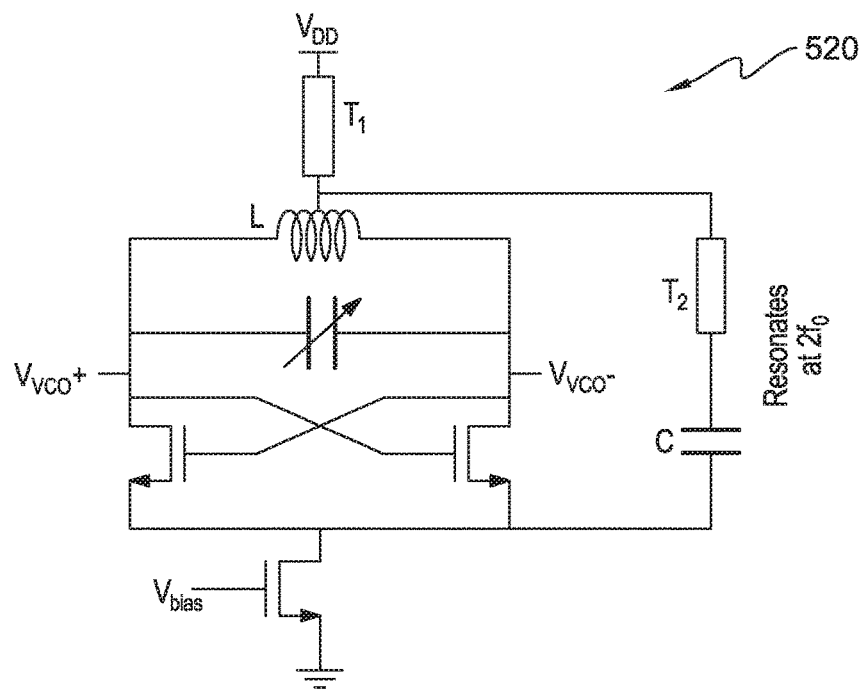
FIG. 14 schematically illustrates an embodiment of the invention implemented in an integrated circuit.
Figure 14:
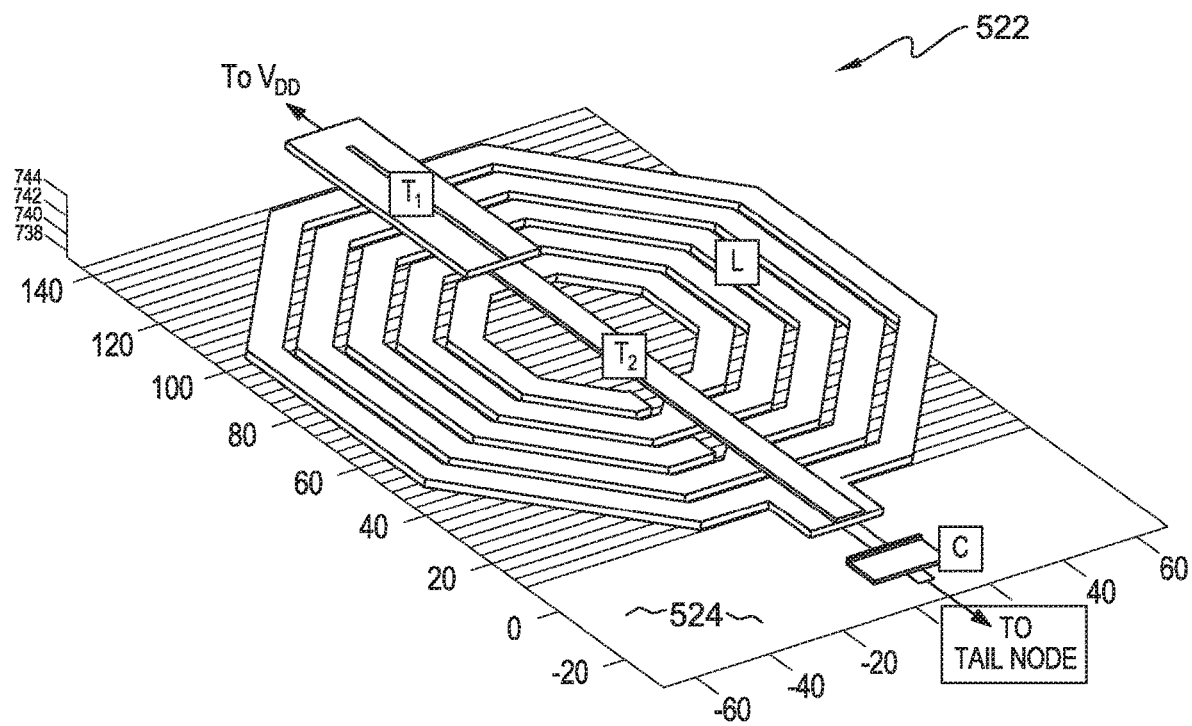

FIG. 14 shows a circuit diagram 520 of an embodiment of this invention and an illustration 522 of an implementation of that circuit in a semiconductor device 524. Embodiments of the invention can be implemented using a modified inductor topology. Due to the differential nature, t-line is unaffected by the inductor signals. Embodiments of the invention can be implemented in a semiconductor device with negligible area overhead and no power overhead.

In an implementation of an embodiment of the invention, from the inductor center-tap, one transmission line connects to supply; and another transmission line connects through a capacitor to the tail node. In an implementation, at least one transmission line goes around the inductor at a considerable distance to avoid signal coupling between the t-line and the inductor.

In embodiments of the invention, the transmission lines are implemented on top of the spiral inductor placed symmetric to the differential inductor The differential signals on the inductor couple to the transmission lines; however, the transmission lines are placed symmetrically so as to perfectly cancel the ac-coupled signals from the inductor to the transmission line. This helps to achieve a low area, low loss implementation of the t-line capacitor short. This implementation also does not consume any dc-power.

Figure 15:
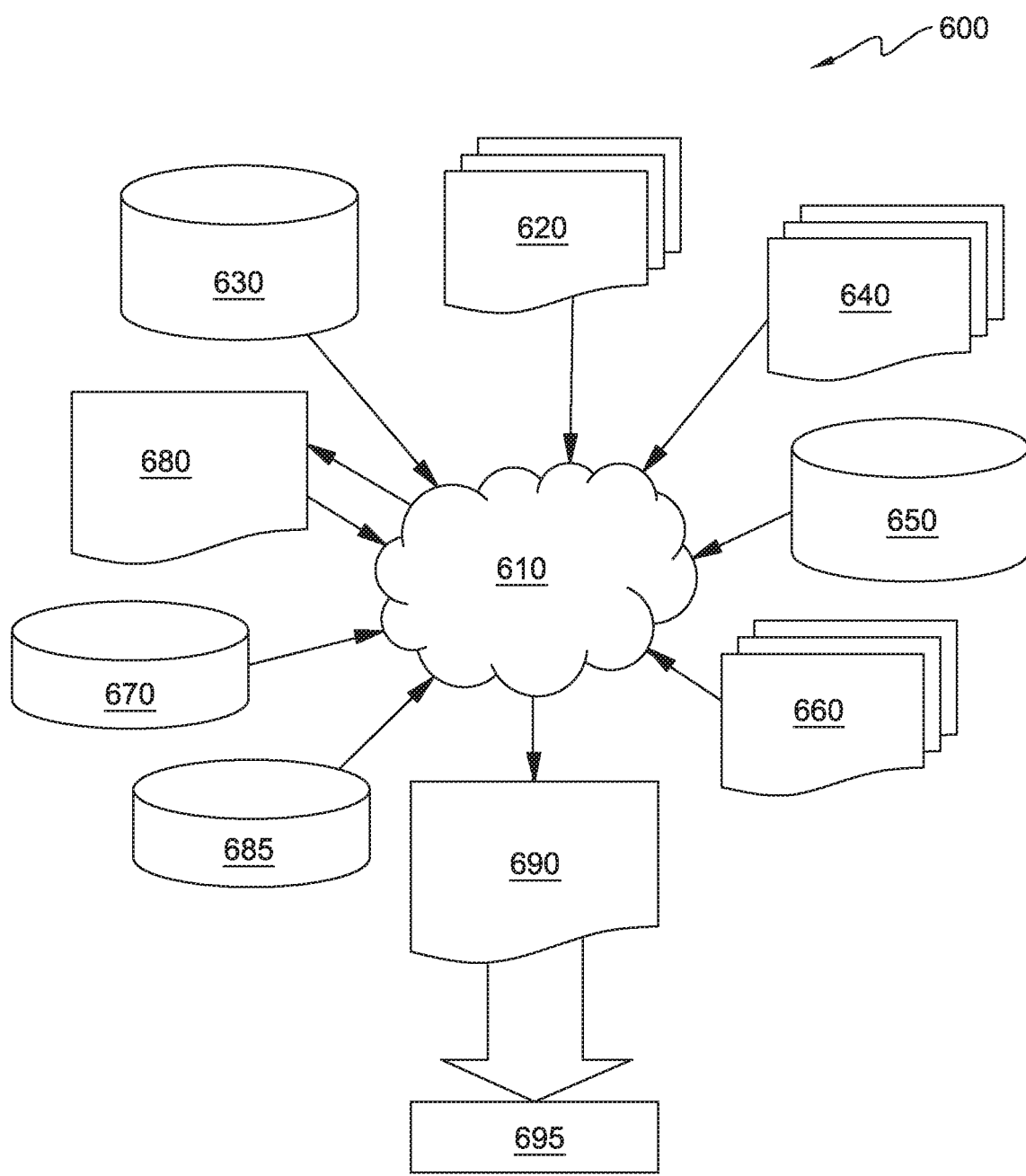
FIG. 15 shows a block diagram of an exemplary design flow that may be used in embodiments of the invention.

FIG. 15 shows a block diagram of an exemplary design flow 600 used for example, in semiconductor IC logic design, simulation, test, layout, and manufacture. Design flow 600 includes processes, machines and/or mechanisms for processing design structures or devices to generate logically or otherwise functionally equivalent representations of the design structures and/or devices described above. The design structures processed and/or generated by design flow 600 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 600 may vary depending on the type of representation being designed. For example, a design flow for building an application specific IC (ASIC) may differ from a design flow for designing a standard component or from a design flow for instantiating the design into a programmable array, for example a programmable gate array (PGA) or a field programmable gate array (FPGA) offered by Altera® Inc. or Xilinx® Inc.

FIG. 15 illustrates multiple such design structures including an input design structure 620 that is preferably processed by a design process 610. Design structure 620 may be a logical simulation design structure generated and processed by design process 610 to produce a logically equivalent functional representation of a hardware device. Design structure 620 may also or alternatively comprise data and/or program instructions that when processed by design process 610, generate a functional representation of the physical structure of a hardware device. Whether representing functional and/or structural design features, design structure 620 may be generated using electronic computer-aided design (ECAD) such as implemented by a core developer/designer. When encoded on a machine-readable data transmission, gate array, or storage medium, design structure 620 may be accessed and processed by one or more hardware and/or software modules within design process 610 to simulate or otherwise functionally represent an electronic component, circuit, electronic or logic module, apparatus, device, or system such as those described above. As such, design structure 620 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 610 preferably employs and incorporates hardware and/or software modules for synthesizing, translating, or otherwise processing a design/simulation functional equivalent of the components, circuits, devices, or logic structures described above to generate a netlist 680 which may contain design structures such as design structure 620. Netlist 680 may comprise, for example, compiled or otherwise processed data structures representing a list of wires, discrete components, logic gates, control circuits, I/O devices, models, etc. that describes the connections to other elements and circuits in an integrated circuit design. Netlist 680 may be synthesized using an iterative process in which netlist 680 is resynthesized one or more times depending on design specifications and parameters for the device. As with other design structure types described herein, netlist 680 may be recorded on a machine-readable data storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 610 may include hardware and software modules for processing a variety of input data structure types including netlist 680. Such data structure types may reside, for example, within library elements 930 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 640, characterization data 950, verification data 960, design rules 970, and test data files 985 which may include input test patterns, output test results, and other testing information. Design process 610 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 610 without deviating from the scope and spirit of the invention. Design process 610 may also include modules for performing standard circuit design processes such as timing analysis, verification, design rule checking, place and route operations, etc.

Design process 610 employs and incorporates logic and physical design tools such as HDL compilers and simulation model build tools to process design structure 620 together with some or all of the depicted supporting data structures along with any additional mechanical design or data (if applicable), to generate a second design structure 690. Design structure 690 resides on a storage medium or programmable gate array in a data format used for the exchange of data of mechanical devices and structures (e.g. information stored in a IGES, DXF, Parasolid XT, JT, DRG, or any other suitable format for storing or rendering such mechanical design structures). Similar to design structure 620, design structure 690 preferably comprises one or more files, data structures, or other computer-encoded data or instructions that reside on transmission or data storage media and that when processed by an ECAD system generate a logically or otherwise functionally equivalent form of one or more of the embodiments of the invention described above. In one embodiment, design structure 690 may comprise a compiled, executable HDL simulation model that functionally simulates the devices described above.

Design structure 690 may also employ a data format used for the exchange of layout data of integrated circuits and/or symbolic data format (e.g. information stored in a GDSII (GDS2), GL1, OASIS, map files, or any other suitable format for storing such design data structures). Design structure 690 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in FIG. 1. Design structure 690 may then proceed to a stage 695 where, for example, design structure 690: proceeds to tape-out, is released to manufacturing, is released to a mask house, is sent to another design house, is sent back to the customer, etc.

The circuits as described above are part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The method as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

While various embodiments are described herein, it will be appreciated from the specification that various combinations of elements, variations or improvements therein may be made by those skilled in the art, and are within the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A voltage controlled oscillator (VCO) comprising:
   an LC tank circuit for generating an oscillator output signal at an oscillator frequency ($f_o$);
   an oscillator core including first and second cross-coupled semiconductor devices connected to the tank circuit to provide regenerative feedback to the tank circuit to help maintain the oscillator output stable;
   a supply node connected to the tank circuit for connecting the VCO to a voltage source;
   a tail node connected to the oscillator core for connecting the VCO to a current source;
   a noise by-pass circuit having a first end connected to the supply node and a second end connected to the tail node and forming a low-impedance by-pass circuit connecting the supply node and the tail node, in parallel with the LC tank circuit and the oscillator core, and including a capacitor and a variable inductance transmission line; and
   a frequency control applied to the transmission line to set the inductance of the transmission line so that the transmission line and the capacitor resonate at a frequency approximately twice the oscillator frequency to at least partially immunize the oscillator core from external noise and to reduce noise contribution from the cross-coupled semiconductor devices.

2. The voltage controlled oscillator according to claim 1, wherein the first end of the noise by-pass circuit is connected to the LC tank circuit.

3. The voltage controlled oscillator according to claim 2, wherein the second end of the noise by-pass circuit is connected to the oscillator core.

4. The voltage controlled oscillator according to claim 3, wherein the variable inductance transmission line is located in series between the voltage source and the capacitor.

5. The voltage controlled oscillator according to claim 4, wherein the capacitor is located in series between the current source and the variable inductance transmission line.

6. The voltage controlled oscillator according to claim 5, further comprising a high impedance component between the supply node and the LC tank circuit, and wherein the high impedance component is located in series between the voltage source and the noise by-pass circuit.

7. The voltage controlled oscillator according to claim 6, wherein the variable inductance transmission line is located in series between the high impedance component and the capacitor.

8. The voltage controlled oscillator according to claim 7, further comprising a transistor located between the current source and the oscillator core, and wherein the transistor is located in series between the current source and the noise by-pass circuit.

9. The voltage controlled oscillator according to claim 8, wherein the capacitor is located in series between the transistor and the variable inductance transmission line.

10. The voltage controlled oscillator according to claim 9, wherein the tail node is connected to a ground; and the capacitor is located in series between the ground and the variable inductance transmission line.

11. A method of operating a voltage controlled oscillator (VCO) comprising an LC tank circuit and an oscillator core, the method comprising:
    using the LC tank circuit for generating an oscillator output signal at an oscillator frequency ($f_o$);
    operating the oscillator core to provide regenerative feedback to the tank circuit to help maintain the oscillator output stable;
    connecting the VCO to a voltage source;
    connecting the VCO to a current source;
    operating a low-impedance, noise by-pass circuit in parallel with the LC tank circuit and the oscillator core, the low-impedance, noise by-pass circuit including a capacitor and a variable inductance transmission line; and
    at a frequency approximately twice the oscillator frequency to at least partially immunize the oscillator core from external noise and to reduce noise contribution from the oscillator core; and applying a frequency control to the transmission line to set the inductance of the transmission line so that the transmission line and the capacitor resonate at a frequency approximately twice the oscillator frequency to at least partially immunize the oscillator core from external noise and to reduce noise contribution from the cross-coupled semiconductor devices.

12. The method according to claim 1, wherein the first end of the noise by-pass circuit is connected to the LC tank circuit.

13. The method according to claim 12, wherein the second end of the noise by-pass circuit is connected to the oscillator core.

14. The method according to claim 13, wherein the variable inductance transmission line is located in series between the voltage source and the capacitor.

15. The method according to claim 14, wherein the capacitor is located in series between the current source and the variable inductance transmission line.

* * * * *